(12) United States Patent
Brurok et al.

(10) Patent No.: US 11,818,177 B2
(45) Date of Patent: *Nov. 14, 2023

(54) METHODS AND SYSTEMS FOR PROCESSING CYBER INCIDENTS IN CYBER INCIDENT MANAGEMENT SYSTEMS USING DYNAMIC PROCESSING HIERARCHIES

(71) Applicant: Capital One Services, LLC, McLean, VA (US)

(72) Inventors: Brian Brurok, Leesburg, VA (US); Mario Cotom, Arlington, VA (US); Christopher Euerle, Arlington, VA (US); Matthew Anderson, Mountain View, CA (US); Margo Chanin, Washington, DC (US); Sean Spaniol, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,349

(22) Filed: Feb. 28, 2023

(65) Prior Publication Data
US 2023/0208885 A1 Jun. 29, 2023

Related U.S. Application Data

(63) Continuation of application No. 16/929,061, filed on Jul. 14, 2020, now Pat. No. 11,627,162.

(51) Int. Cl.
*H04L 9/40* (2022.01)
*G06F 3/0484* (2022.01)
(Continued)

(52) U.S. Cl.
CPC ............ *H04L 63/20* (2013.01); *G06F 3/0484* (2013.01); *G06F 16/2246* (2019.01); *G06F 16/245* (2019.01)

(58) Field of Classification Search
CPC ... H04L 63/20; G06F 16/245; G06F 16/2246; G06F 3/0484
See application file for complete search history.

(56) References Cited

U.S. PATENT DOCUMENTS

| | | | |
|---|---|---|---|
| 9,697,352 B1* | 7/2017 | Armstrong | .............. G06F 21/57 |
| 2003/0004689 A1* | 1/2003 | Gupta | ................. H04L 63/1408 |
| | | | 702/188 |

(Continued)

OTHER PUBLICATIONS

Brown et al., "Towards Mature Federated Cyber Incident Management and Information Sharing Capabilities in NATO and NATO Nations", Nov. 2019, IEEE Military Communications Conference, pp. 1-5 (Year: 2019).*

(Continued)

*Primary Examiner* — Kenneth W Chang
(74) *Attorney, Agent, or Firm* — Perkins Coie LLP (57) ABSTRACT

Methods and systems are also described for an integrated cyber incident management system that may store native data corresponding to fields of cyber incident management system (or other non-integrated systems) and integration data (e.g., viewable through a user interface of the integrated cyber incident management system), which describes a relationship of the native data to the integrated cyber incident management system, at a structure node in the architecture of the integrated cyber incident management system. The structure node may correspond to the convergence of two structures in the architecture of the integrated cyber incident management system. Each structure may itself correspond to a native hierarchal relationship in a non-integrated cyber incident management system.

20 Claims, 6 Drawing Sheets

(51) Int. Cl.
G06F 16/22 (2019.01)
G06F 16/245 (2019.01)

(56) References Cited

U.S. PATENT DOCUMENTS

| | | | | |
|---|---|---|---|---|
| 2005/0229151 A1* | 10/2005 | Gupta | G06Q 10/06 | 717/101 |
| 2006/0031938 A1* | 2/2006 | Choi | H04L 63/1441 | 726/25 |
| 2013/0067574 A1* | 3/2013 | Brueckner | H04L 63/1416 | 726/23 |
| 2014/0201836 A1* | 7/2014 | Amsler | H04L 63/20 | 726/23 |
| 2014/0259095 A1* | 9/2014 | Bryant | H04L 63/20 | 726/1 |
| 2015/0163242 A1* | 6/2015 | Laidlaw | H04L 63/1466 | 726/22 |
| 2015/0365438 A1* | 12/2015 | Carver | H04L 63/1441 | 726/1 |
| 2018/0109545 A1* | 4/2018 | Weilbacher | H04L 63/1433 | |

OTHER PUBLICATIONS

Kim et al., "Design of a Cyber Threat Information Collection System for Cyber Attack Correlation", Jan. 2018, International Conference on Platform Technology and Service, pp. 1-6 (Year: 2018).*

* cited by examiner

| Issues | Pull requests | Labels | Milestones | | Filters ▽ | 🔍 is:open is:issue | | New Issue |

202

208

- ✓ 104 Open ✓ 9,660 Closed     Author ▽   Labels ▽   Milestones ▽   Assignee ▽   Sort ▽

- ⊙ Data Breach. form-group-sm .form-group-lg shring textarea [confirmed]
  #13989 opened 11 hours ago by iimistudios ⬍ v3.2.1     💬 4

← 206    [Tim] ← 210

- ⊙ Missing Domain   [confirmed] [js]
  #13987 opened 15 hours ago by hnrch02 ⬍ v3.2.1

← 204

- ⊙ Phishing Attack - EMail     💬 6
  #13981 opened a day ago by SDCore

- ⊙ Table Corruption [css]
  #13978 opened a day ago by Tjoosten

- ⊙ docs/dist files [docs]     💬 7
  #13977 opened 2 days ago by XhmikosR ⬍ v3.2.1

- ⊙ Potential solution to #4647 [js]     💬 4
  #13976 opened 2 days ago by julioarmandof

- ⊙ Bootstrap site: right-hand navigation text becomes rasterized after scrolling [css] [docs]     💬 4
  #13974 opened 2 days ago by mg1075 ⬍ v3.2.1

- ⊙ Password Compromised two clicks     💬 1
  #13972 opened 2 days ago by Kizmar   v3.2.1

METHODS AND SYSTEMS FOR PROCESSING CYBER INCIDENTS IN CYBER INCIDENT MANAGEMENT SYSTEMS USING DYNAMIC PROCESSING HIERARCHIES

CROSS-REFERENCE TO RELATED APPLICATION(S)

This application is a continuation of U.S. patent application Ser. No. 16/929,061, filed Jul. 14, 2020. The content of the foregoing application is incorporated herein in its entirety by reference.

FIELD OF THE INVENTION

The invention relates to processing cyber incidents in cyber incident management systems using dynamic processing hierarchies.

BACKGROUND

Cyber incident management is typically team-based and involves multiple team members (analysts) and incident detection systems working together to resolve a given cyber incident (e.g., a data breach, phishing attack, etc.). To facilitate this team activity and system coordination, cyber incident management systems may include a codebase (e.g., cyber incident management playbook) that features incident histories and procedures for cyber incident management. The system may enable automatic management of different cyber incidents, as well as the coordination of different analysts' contributions. However, the types of cyber incidents are constantly evolving and routinely involve a cat-and-mouse approach to detecting and resolving issues. Due to the diversity of types of cyber incidents and the nature of cyber incidents having been specifically designed to avoid automatic detection, automated cyber incident management is infeasible.

SUMMARY

Methods and systems are described herein for cyber incident management systems using dynamic processing hierarchies. As stated above, the automated cyber incident management is infeasible as cyber incidents are specifically designed to avoid automatic detection. In view of this, cyber incident playbooks (e.g., a codebase developed and used by cyber incident analysts to detect and resolve cyber incidents) are constantly updated and reviewed. This is a challenging and time-consuming task because of the large quantities of data that must be reviewed on a daily basis and the specific queries that must be written to detect and resolve issues. While some queries may be stored in the playbook as cyber incidents evolve, these cyber incidents may be specifically designed to evade previously written code.

In view of this, the cyber incident management systems use dynamic processing hierarchies for detecting and resolving cyber incidents. For example, the system may access a plurality of data structures. An initial data structure may be a fully automated data structure and may process a cyber incident according to a hierarchy of tasks. This processing may include retrieving data from third parties (e.g., third party cyber intelligence vendors), enriching data sets, analyzing characteristics about the cyber incident, queuing cyber incidents, etc. The system may then select, based on a comparison of characteristics of the cyber incident, a node in the hierarchy of tasks of the initial data structure for transitioning to a different data structure (e.g., featuring a different hierarchy of tasks). For example, by selecting convergence points from one hierarchy of tasks to another, the methods and systems do not require a single data structure to resolve any one cyber incident. This allows the cyber management system to be more agile and prevent new cyber incidents from avoiding detection and resolution.

Moreover, as the system processes a cyber incident through a hierarchy, the system gathers information and enriches current data about a cyber incident. If the system is unable to resolve the cyber incident through one or more automated hierarchies, the system may transition the processing of the cyber incident to another data structure that is partially manual. For example, the system may transfer the processing of the cyber incident to a data structure that queries a user (e.g., a cyber incident analyst). In such cases, the previous processing has already gathered information and enriched data that facilitates an efficient resolution of the cyber incident. Thus, the system provides distinct advantages of the conventional static cyber incident resolution systems.

Furthermore, by tracking these points of convergence, the integrated cyber incident management system can generate additional types of data that are relevant to project management. For example, based on the structure nodes, the system may generate additional charts, graphs, and information that intuitively communicate progress in the resolution of the cyber incident to users with different knowledge and/or skill sets. As these additional charts, graphs, and information are based on the structure nodes, these additional charts, graphs, and information have the additional benefit of communicating the relationships between various data structures and/or their respective tasks and sub-tasks.

In one aspect, systems and methods are described for processing cyber incidents in cyber incident management systems using dynamic processing hierarchies. For example, the system may receive, via a user interface, a user request to process a cyber incident through an integrated cyber incident management system, wherein the cyber incident includes an incident characteristic. The system may then retrieve, using control circuitry, a first structure for a cyber incident management system, wherein the first structure defines a first hierarchy of tasks through which cyber incidents are automatically processed without user inputs. The system may then retrieve, using the control circuitry, a second structure for the cyber incident management system, wherein the second structure defines a second hierarchy of tasks through which cyber incidents are processed based on user inputs received in response to user queries generated for display on the user interface. The system may then compare, using the control circuitry, the incident characteristic to incident characteristics in a database of historical incidents to determine a shared structure node for transitioning from the first hierarchy of tasks to the second hierarchy of tasks at the shared structure node. The system may generate, using the control circuitry, an integrated structure by combining the first structure and the second structure at the shared structure node. The system may process the cyber incident through the integrated structure to the shared structure node. The system may generate for display, on the user interface, a user query comprising native data, for the cyber incident, and integration data that describes, in a human-readable format, a relationship of the native data to the integrated structure.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
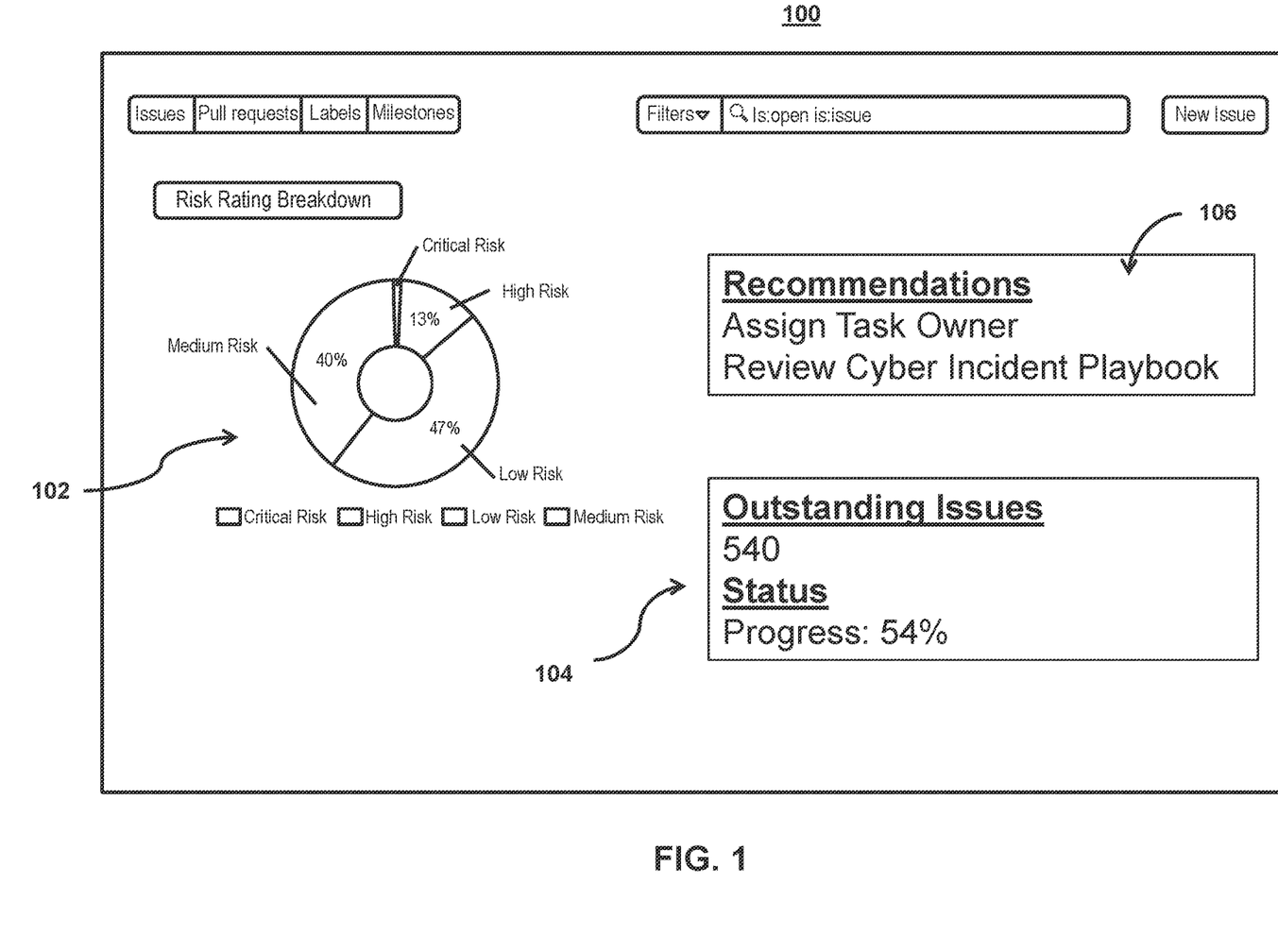
FIG. 1 shows an illustrative user interface for an integrated cyber incident management system, in accordance with one or more embodiments.

FIG. 1 shows an illustrative user interface for an integrated cyber incident management system, in accordance with one or more embodiments. For example, the system and methods described herein may generate for display, on a local display device (e.g., user device 422 and 424 (FIG. 4) described below), a user interface for an integrated cyber incident management system.

User interface 100 may comprise a user interface for an integrated cyber incident management system. An integrated cyber incident management system may include a cyber incident management system that integrates multiple other cyber incident management systems (e.g., a cyber incident management system). Through user interface 100, the integrated cyber incident management system, may receive a user request to access an integrated structure (e.g., as shown in user interface 300 (FIG. 3) below) and/or perform one or more operations (e.g., as shown in user interface 200 (FIG. 2) below) such as monitoring progress of one or more tasks for a project and/or identifying outstanding issues for the project. For example, user interface 100 may provide the ability to provide visual guidance for all technical teams and to respond, create, modify and export visual representation for each process/workflow. User interface 100 may include activity logs that are a detailed log of actual process followed (automated and manual), provide result status of all automations (success or fail), and/or log a defined set of user activities.

User interface 100 may generate display data related to an integrated cyber incident management system. For example, the system may store native data corresponding to fields of cyber incident management systems (or other non-integrated systems) and integration data (e.g., integration data 104). For example, integration data 104 may describe a relationship of the native data to the integrated cyber incident management system at a structure node (e.g., structure node 104) in the architecture of the integrated cyber incident management system. The structure node may correspond to the convergence of two structures in the architecture of the integrated cyber incident management system. Each structure may itself correspond to a native hierarchal relationship in a non-integrated cyber incident management system.

In some embodiments, user interface 100 (or the integration data therein) may be presented as a status page. The status page may include summary information about a cyber incident, affected systems/domains, responsible team members (e.g., analysts assigned to resolve the issue), etc. The status page may also include queries that may be performed (e.g., queries based on progress, affected systems, milestones, governance, etc.). User interface 100 may also include a Gantt chart indicating progress for one or more tasks and sub-tasks, filters, and/or provide view changes. User interface may also include analyst listings and metrics related to the cyber incident (e.g., velocity, etc.).

Native data may comprise native data or native dataformats comprise data that originates from and/or relates to the cyber incident management system, the non-integrated cyber incident management systems, and/or their respective plugins. In some embodiments, native data may include data resulting from native code, which is code written specifically for the cyber incident management system, the non-integrated cyber incident management systems, a respective plugin designed therefor. The native data may also include data or metadata related to the cyber incident. The native data may also include data pull from a remote source (e.g., a cyber incident intelligence vendor). In some embodiments, the native data may describe a current progress of a task in the first hierarchy of tasks or the second hierarchy of tasks. In some embodiments, the native data for the first structure or the second structure describes a source of a field value for a task in the first hierarchy of tasks or the second hierarchy of tasks.

The integration data may be presented in any format and/or representation of data that can be naturally read by humans. In some embodiments, the integration data may appear as a graphical representation of data (e.g., graph 102). For example, the integration data may comprise a sunburst graph of the integrated structure. In such cases, generating the sunburst graph may comprise determining a plurality of structure nodes for the integrated structure and graphically representing a relationship of the plurality of structure nodes. In some embodiments, the relationship of the native data to the integrated structure may comprise a graphical display describing a hierarchal relationship of the first hierarchy of tasks and the second hierarchy of tasks, a point of processing of a cyber incident, and/or information is known or not known about the cyber incident as well as include data pre-fetched about the cyber incident. For example, graph 102 may include an incident scoring that indicates a severity, classification, and/or other metric.

User interface 100 may also include recommendation 106. For example, selection of recommendation 106 may provide collaborative content management to define procedures and instructions and integrate content from or link to confluence page which contain detailed work instructions (and ability to display graphical process representation).

Figure 2:
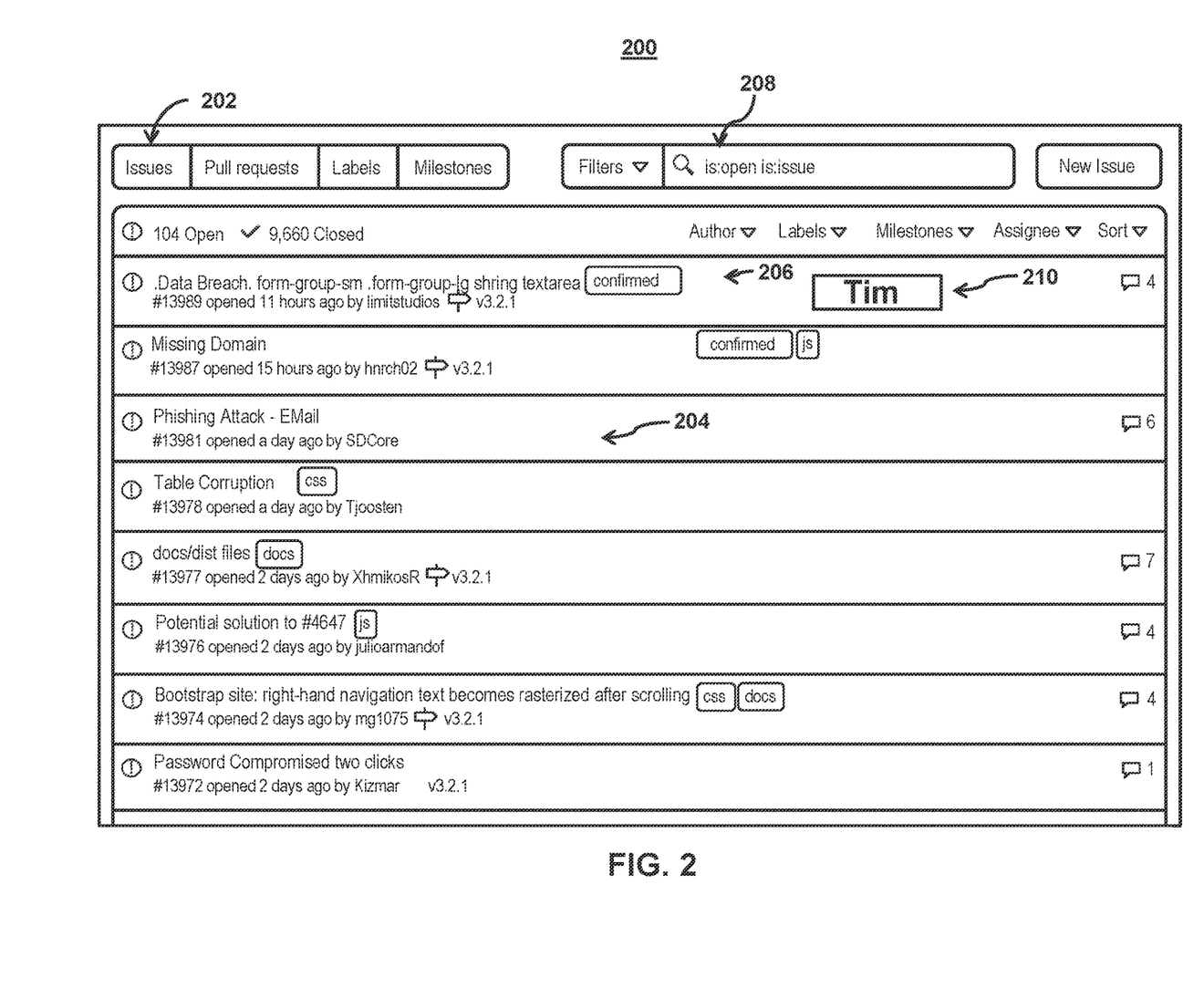
FIG. 2 shows another illustrative user interface for an integrated cyber incident management system, in accordance with one or more embodiments.

FIG. 2 shows another illustrative user interface for an integrated cyber incident management system, in accordance with one or more embodiments. For example, the system and methods described herein may generate for display, on a local display device (e.g., user devices 422 and 424 (FIG. 4) described below), a user interface for an integrated cyber incident management system. For example, FIG. 2 displays user interface 200. User interface 200 may represent an exemplary user interface for an integrated cyber incident management system. As such, user interface 200 may include a plurality of incidents (e.g., incident 204) that need to be resolved. For example, user interface 200 may provide the ability to create and track security incident, assign task owners, tag artifact types, capture work notes, orchestrate response activities for all incidents, and/or customize fields logged.

As presented in FIG. 2, the plurality of cyber incidents may be filtered based on a user selection requesting the display of resolved and/or pending cyber incidents (e.g., identified through routine detection, manual reporting, in accordance with cyber incident playbook procedures, and/or automatically through an issue-spotting, incident tracking, or bug-tracking program). For example, a user (e.g., a cyber analyst) may filter the cyber incidents by selecting an icon associated with cyber incidents having pending issues (e.g., icon 202).

User interface may further include an icon featuring information about a given issue (e.g., icon 206). For example, icon 206 may indicate the type of issue, how the issue was detected (e.g., based on manual or automatic review), and/or whether or not the issue is confirmed to exist. User interface 200 may also include an icon indicating a second contributor that is assigned to resolve the issue (e.g., icon 210). FIG. 2 may also include search bar 208, which may allow a user to search for a given issue, task, and/or other information related to one or more structures within the integrated cyber incident management system. Search bar 208 may also allow a user to search for a given project or task and/or review the progress of a portion of the project and/or the progress of the project overall. In some embodiments, user interface 200 may also provide recommendations for one or more issues and/or tasks related to the integrated cyber incident management system. For example, user interface 200 may be used for staffing the project and/or tasks related to the projects.

Figure 3:
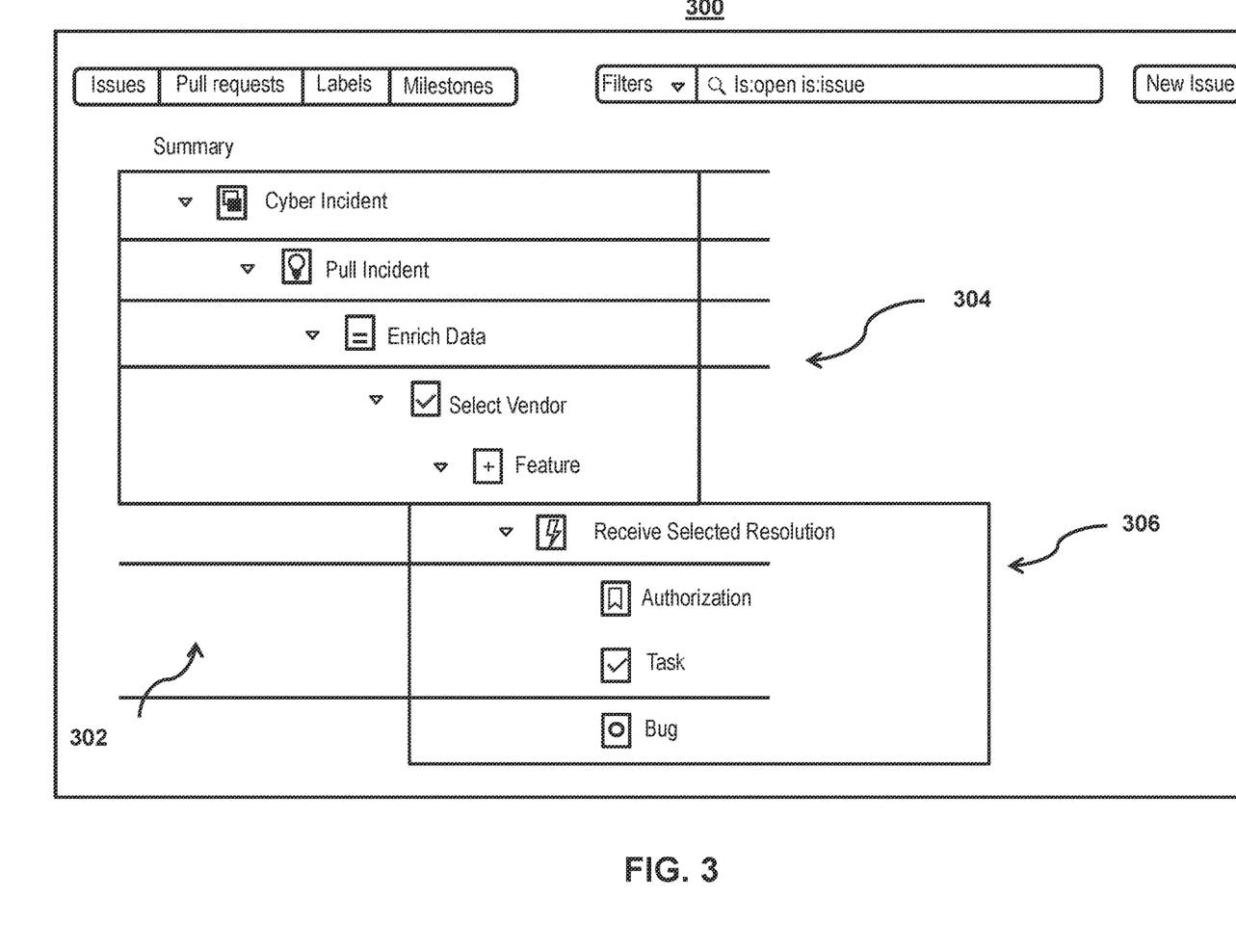
FIG. 3 shows another illustrative user interface for an integrated cyber incident management system, in accordance with one or more embodiments.

FIG. 3 shows another illustrative user interface for an integrated cyber incident management system, in accordance with one or more embodiments. For example, the system and methods described herein may generate for display, on a local display device (e.g., user device 422 and 424 (FIG. 4) described below), a user interface for an integrated cyber incident management system. User interface 300 may comprise a user interface for an integrated cyber incident management system. Through user interface 300, the integrated cyber incident management system may receive a user request to access an integrated data (e.g., as shown in user interface 100 (FIG. 1) above) and/or perform one or more operations (e.g., as shown in user interface 200 (FIG. 2) above) such as monitoring progress of one or more tasks for a project and/or identifying outstanding issues for a cyber incident.

In some embodiments, user interface 300 may illustrate dynamic decision trees that provide ticket navigation structures to direct new analysts to the right resolution procedure through a context generated set of question and answers, unique per process as well as the results from automations or user inputs lead the analyst to the right next step and ultimately to the complete resolution. For example, due to the dynamic nature of the decision trees provided by selecting a shard node, the system may provide automated actions invoked from newly detected cyber incidents directly to execute response actions such as investigation and remediation. The system may also include bi-directional integration with existing ticketing systems (cyber and non-cyber managed) as well as auto ingestion of cyber incidents.

The integrated cyber incident management system may include an integrated structure. The integrated structure (e.g., integrated structure 302) may define an integrated hierarchy of tasks for the integrated cyber incident management system. For example, integrated structure 302 may comprise a plurality of types of data structures or data models. One such data structure is a hierarchical data structure. A hierarchical database structure may comprise a data model in which the data is organized into a tree-like structure. The data may be stored as records which are connected to one another through links. A record is a collection of fields with each field containing only one value. The type of a record defines which fields the record contains. For example, in the hierarchical database structure each child record has only one parent, whereas each parent record can have one or more child records.

Each record may act as a node. In some cases, the node may be a structure node. For example, the structure node (e.g., structure node 104 (FIG. 1)) may be a basic unit of a data structure, such as a link between one or more structures. Each structure node may contain data and also may link to other nodes. For example, the integrated structure may be represented by a non-linear data structure of nodes and edges (e.g., a structure graph). In some embodiments, the system may implement links between nodes through pointers. Additionally, a structure node may be a node shared by one or more structures (e.g., a point of integration of a first structure and a second structure).

For example, integrated structure 302 may comprise first structure 304 and second structure 306. The first structure may comprise a data organization, management, and storage format that enables efficient, automated processing for the cyber incident management system. For example, the first data structure may include a collection of data values, data fields, the relationships among them, and the functions or operations that can be applied to the data. For example, the first data structure may be based on a cyber incident playbook that indicates automated tasks for detecting, classifying, and/or resolving cyber incidents.

In some embodiments, the second data structure may comprise a data organization, management, and storage format that enables efficient access and modification for the cyber incident management system. For example, the second data structure may include a collection of data values, data fields, the relationships among them, and the functions or operations that can be applied to the data. That is, the second data structure may be based on a cyber incident playbook that indicates non-automated or partially automated tasks for detecting, classifying, and/or resolving cyber incidents (e.g., tasks that require user input or approval).

As shown in integrated structure 302, first structure 304 and second structure 306 may share a node (e.g., a structure node may exist) at between the last automated level of first structure 304 and the first partially-automated or manual level of second structure 306. For example, integrated structure 302, as shown in FIG. 3, may reflect a structure graph of integrated structure 302. It should also be noted that in some embodiments, the system may build integrated structure 302 based on a consolidated graph from multiple structures (e.g., first structure 304 and second structure 306). That is, the structure graph may be split across multiple structures and then consolidated and joined.

Figure 4:
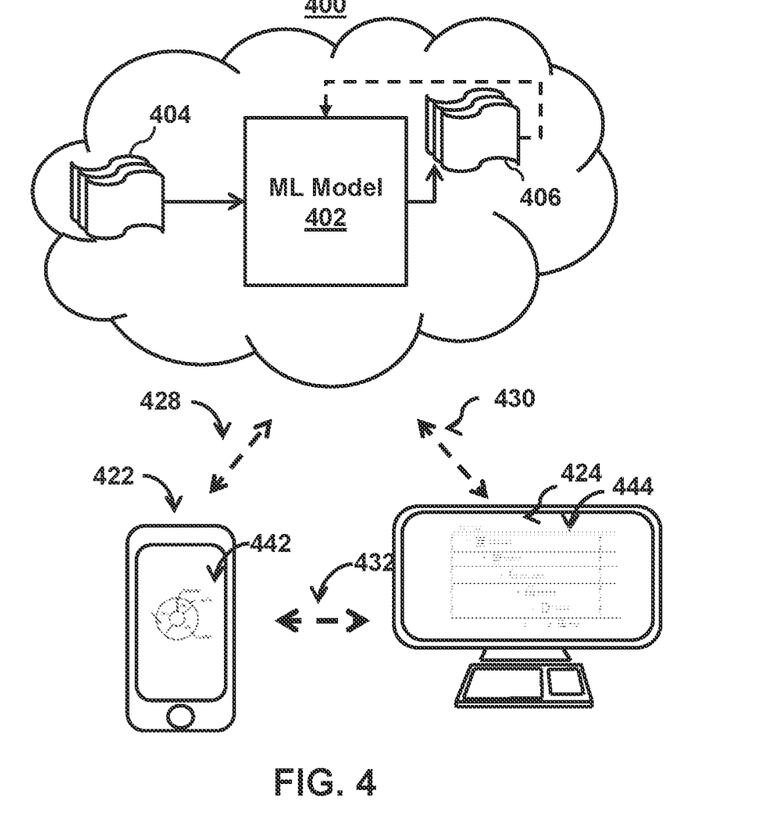
FIG. 4 shows an illustrative system for processing cyber incidents in cyber incident management systems using dynamic processing hierarchies, in accordance with one or more embodiments.

FIG. 4 shows an illustrative system for processing cyber incidents in cyber incident management systems using dynamic processing hierarchies, in accordance with one or more embodiments. As shown in FIG. 4, system 400 may include user device 422, user device 424, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes machine learning model 402, which may be implemented on user device 422 and user device 424, or accessible by communication paths 428 and 430, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include: (i) system storage that is provided integrally (e.g., substantially non-removable) with servers or client devices; and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, one or more of the components of system 400 may include cloud-based components (e.g., cloud-based memory, cloud-based control circuitry, cloud-based I/O circuitry, etc.). For example, cloud-based memory may be configured to: store a first structure for a cyber incident management system, wherein the first structure defines a first hierarchy of tasks for the cyber incident management system; and store a second structure for a non-integrated cyber incident management system, wherein the second structure defines a second hierarchy of tasks for the non-integrated cyber incident management system. Cloud-based control circuitry may be configured to: receive a user request to access an integrated structure for an integrated cyber incident management system, wherein the integrated structure defines an integrated hierarchy of tasks for the integrated cyber incident management system; and receive a user selection of the structure node. Cloud-based I/O circuitry may be configured to generate for display, on a local display device, native data, for the first structure or the second structure, and integration data that describes, in a human-readable format, a relationship of the native data to the integrated structure.

FIG. 4 also includes communication paths 428, 430, and 432. Communication paths 428, 430, and 432 may include the Internet, a mobile phone network, a mobile voice or data network (e.g., a 4G or LTE network), a cable network, a public switched telephone network, or other types of communications network or combinations of communications networks. Communication paths 428, 430, and 432 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 4, machine learning model 402 may take inputs 404 and provide outputs 406. The inputs may include multiple data sets such as a training data set and a test data set. Each of the plurality of data sets (e.g., inputs 404) may include data subsets with common characteristics. The common characteristics may include characteristics about a cyber incident, cyber incident characteristics, a structure, a structure node, a task and/or past integrations of data structures. For example, in some embodiments, the system may train a model to select a shared structure node based on the efficiency and/or accuracy at which the cyber incident was resolved.

In some embodiments, outputs 406 may be fed back to machine learning model 402 as input to train machine learning model 402 (e.g., alone or in conjunction with user indications of the accuracy of outputs 406, labels associated with the inputs, or with other reference feedback information). For example, the time an analyst required to resolve a cyber incident and the location of the shared node may be fed back into the machine learning model in order to further refine and/or improve the machine learning model. In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

For example, in some embodiments, machine learning model 402 may be trained to generate an integrated structure. For example, machine learning model 402 may be trained to determine a type of the cyber incident and/or identify a cyber incident type based on incident characteristic. The system may also be trained to match a cyber incident and/or incident characteristic to a database of historical incidents to determine a shared structure node. In another example, machine learning model 402 may be trained to determine a rule set for automatically generating the integrated structure based on the first data structure and the second data structure and/or generate an integrated structure based on the rule set, wherein the integrated structure includes a structure node shared by the first structure and the second structure. In such cases, the system may use a regression and classification algorithm to create a training model that can use to predict the class or value of the target variable (e.g., a shared structure node).

In some embodiments, machine learning model 402 may include an artificial neural network. In such embodiments, machine learning model 402 may include input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 202 correspond to a classification of machine learning model 402 and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free flowing, with connections interacting in a more chaotic and complex fashion. During testing, an output layer of machine learning model 402 may indicate whether or not a given input corresponds to a classification of machine learning model 402 (e.g., a location of a shared structure node in an integrated data structure).

Figure 5:
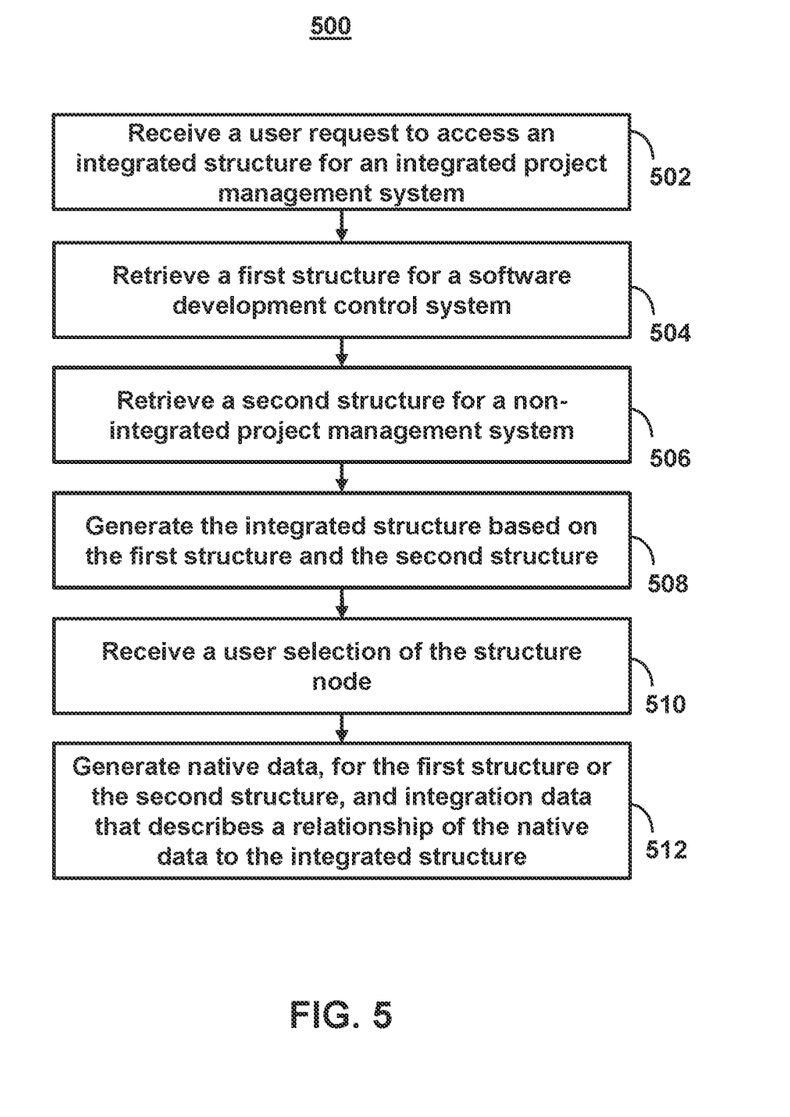
FIG. 5 shows a flowchart of the steps involved in processing cyber incidents in cyber incident management systems using dynamic processing hierarchies, in accordance with one or more embodiments.

FIG. 5 shows flowchart of the steps involved for processing cyber incidents in cyber incident management systems using dynamic processing hierarchies. For example, process 500 may represent the steps taken by one or more devices as shown in FIG. 4 when integrating cyber incident management systems and cyber incident management systems. In some embodiments, process 500 may be combined with one or more steps of process 600 (FIG. 6)). For example, process 500 may relate to an integrated cyber incident management system that may stores native data corresponding to fields of cyber incident management systems (or other non-integrated systems) and integration data (e.g., viewable through a user interface (e.g., user interface 100 (FIG. 1)). The integration data may describe a relationship of the native data to the integrated cyber incident management system, at a structure node in the architecture of the integrated cyber incident management system. The structure node may correspond to the convergence of two structures in the architecture of the integrated cyber incident management system. Each structure may itself correspond to a native hierarchal relationship in a non-integrated cyber incident management system.

At step 502, process 500 receives (e.g., using control circuitry of one or more components of system 400 (FIG. 4)) a user request to process a cyber incident through an integrated cyber incident management system. For example, the system may receive (e.g., via a user interface 100 (FIG. 1)) a user request to access an integrated structure for an integrated cyber incident management system, wherein the integrated structure defines an integrated hierarchy of tasks for the integrated cyber incident management system. For example, the system may receive a user request to process a cyber incident through an integrated cyber incident management system, wherein the cyber incident includes an incident characteristic. For example, the system may receive a user query for the integrated cyber incident management system, determine that a response to the user query is based on a task in a first hierarchy, retrieve native task data for the task, and generate for display the response based on the native task data.

At step 504, process 500 retrieves (e.g., using control circuitry of one or more components of system 400 (FIG. 4)) a first structure for a cyber incident management system. For example, the system may retrieve a first structure for a cyber incident management system, wherein the first structure defines a first hierarchy of tasks through which cyber incidents are automatically processed without user inputs. In some embodiments, the first data structure may comprise a data organization, management, and storage format that enables efficient, automated processing for the cyber incident management system. For example, the first data structure may include a collection of data values, data fields, the relationships among them, and the functions or operations that can be applied to the data. For example, the first data structure may be based on a cyber incident playbook that indicates automated tasks for detecting, classifying, and/or resolving cyber incidents.

For example, the system may, in response to receiving the user request to access the integrated structure, determine that the integrated structure comprises the first structure and the second structure. The system may then, in response to determining that the integrated structure comprises the first structure and the second structure, access: a first remote issue link to a first server housing the first structure; and a second remote issue link to a second server housing the first structure.

At step 506, process 500 retrieves (e.g., using control circuitry of one or more components of system 400 (FIG. 4)) a second structure for the cyber incident management system. For example, the system may retrieve a second structure for the cyber incident management system, wherein the second structure defines a second hierarchy of tasks through which cyber incidents are processed based on user inputs received in response to user queries generated for display on the user interface. In some embodiments, the second data structure may comprise a data organization, management, and storage format that enables efficient access and modification for users of the cyber incident management system to process cyber incidents. For example, the second data structure may include a collection of data values, data fields, the relationships among them, and the functions or operations that can be applied to the data. That is, the second data structure may be based on a cyber incident playbook that indicates non-automated or partially automated tasks for detecting, classifying, and/or resolving cyber incidents (e.g., tasks that require user input or approval).

At step 508, process 500 compares (e.g., using control circuitry of one or more components of system 400 (FIG. 4)) the cyber incident to historical cyber incidents to determine a shared structure node for transitioning from the first data structure to the second data structure. For example, the system may compare the incident characteristic to incident characteristics in a database of historical incidents to determine a shared structure node for transitioning from the first hierarchy of tasks to the second hierarchy of tasks at the shared structure node. For example, the system may determine that incident characteristics such as type of cyber incident, source of the cyber incident, forensic evidence related to the cyber incident, etc. indicates similarities between the cyber incident and a historic cyber incident. The system may then select a shared structure node (e.g., a point as which the system needs to transition from a fully automated to non-automated or partially automated system) based on the similarities. For example, if the system detects a phishing attack, the system may select a shared structure node based on a point at which an analyst's input is required. However, the system may provide automatic data gathering and other evidence collection to aid the analyst in his/her review.

At step 510, process 500 generates (e.g., using control circuitry of one or more components of system 400 (FIG. 4)) the integrated structure based on the first structure and the second structure. For example, the system may generate an integrated structure by combining the first structure and the second structure at the shared structure node. In some embodiments, generating the integrated structure based on the first structure and the second structure may comprise retrieving a structure graph for the integrated structure. For example, the structure graph may indicate a location of the structure node in the integrated structure. This structure graph may be selected based on the structure graph corresponding to a type of incident determined to correspond (e.g., in step 508) to the cyber incident.

For example, the system may generate a decision table from the first and second data structures (which may comprise decision trees). The decision table is the linearization of a decision tree, being an alternative way of representing it. During the merging of the two data structures, common components of both data structures (e.g., data, formats of data, standards, etc.) are presented in decision table form. The system generates an output that is the integrated structure. The integrated structure is also presented in the decision table form. During integration, the set of values of each region (e.g., each node) on each data structure are compared to discover common sets of values across each variable (mapped as a dimension in a multi-dimensional space). The integrated values of each variable from each pair of regions (e.g., nodes) may have a plurality of potential outcomes. If there are common values (e.g., values of a common format), then these are assigned to that variable in the merged region (i.e., the shared structure node). Accordingly, data enriched by processing through the first data structure is provided to the second data structure. If there are no common values, then they are considered disjoint nodes.

The system may further apply thresholds during the node selection process to limit the data, variables, etc. that are considered disjointed. For example, if there are no common values the system may select a different node. In contrast, if there are a particular number of common or uncommon values, the system may compare this amount to a threshold amount. This threshold may correspond to a type of cyber incident or other incident characteristic (e.g., infection rate, number of affected systems, etc.). If the amount is equal to or exceeds the threshold, the system may select the node as a shared structure node. Otherwise, the system may select a different shared structure node and/or query a user.

In some embodiments, the system may also assign classes to different nodes. The class may be based on a function, format, or other characteristic of data associated with the node. The system may in such cases compare the nodes to ensure that the pair have the same class. If no conflicted is detected, the system may continue with integration. Otherwise, the system may select a new shared structure node and/or remove the conflicting nodes from the integrated structure. If the system removes a node, the system may ensure a subsequent node that is selected does not conflict. In some embodiments, the system may also iteratively filter and/or reduce the number of nodes that must be examined. For example, the system may determine which nodes may be joined by determining a set of nodes that have the same class and all variables have equal values (or a threshold number of equal values).

At step 512, process 500 processes (e.g., using control circuitry of one or more components of system 400 (FIG. 4)) the cyber incident. For example, the system may process the cyber incident through the integrated structure to the shared structure node. For example, the structure node may be a basic unit of a data structure, such as a linked between one or more structures. Each structure node may contain data and also may link to other nodes. For example, the integrated structure may be represented by a non-linear data structure of nodes and edges. In some embodiments, the system may implement links between nodes through pointers. During processing, the system may process the cyber incidents according to tasks associated with each node in the structure.

At step 514, process 500 generates (e.g., using control circuitry of one or more components of system 400 (FIG. 4)) for display a user query comprising native data. For example, the system may generate for display (e.g., on user interface 100 (FIG. 1)) a user query comprising native data, for the cyber incident, and integration data that describes, in a human-readable format, a relationship of the native data to the integrated structure.

For example, native data may comprise native data or native data-formats that originates from and/or relates to the cyber incident management system, the non-integrated cyber incident management systems, or a respective plugin designed therefor. In some embodiments, native data may include data resulting from native code, which is code written specifically for the cyber incident management system, the non-integrated cyber incident management systems, or a respective plugin designed therefor. The native data may also include data or metadata related to the cyber incident. The native data may also include data pull from a remote source (e.g., a cyber incident intelligence vendor). In some embodiments, the native data may describe a current progress of a task in the first hierarchy of tasks or the second hierarchy of tasks. In some embodiments, the native data for the first structure or the second structure describes a source of a field value for a task in the first hierarchy of tasks or the second hierarchy of tasks.

The integration data may include data that describes the current location or node in the integrated data structure. For example, the integration data may describe what information is known or not known about the cyber incident as well as include data pre-fetched about the cyber incident. The integration data may be presented in any format and/or representation of data that can be naturally read by humans (e.g., via a user interface such as user interface 100 (FIG. 1)). In some embodiments, the integration data may appear as a graphical representation of data. For example, the integration data may comprise a graph of the integrated structure (e.g., graph 102 (FIG. 1)). In such cases, generating the graph (e.g., a sunburst graph) may comprise determining a plurality of structure nodes for the integrated structure and graphically representing a relationship of the plurality of structure nodes (e.g., as shown in FIG. 1). In some embodiments, the relationship of the native data to the integrated structure may comprise a graphical display describing a hierarchal relationship of the first hierarchy of tasks and the second hierarchy of tasks (e.g., as shown in FIGS. 1 and 3).

In some embodiments, the system may allow a user to update and/or edit the integration data. For example, the system may receive a user edit to the integration data and then store the edited integration data. The system may then generate for display the edited integration data subsequently. For example, the system may allow users with a given authorization to edit integration data, subject to that authorization. In such cases, the integration data may have read/write privileges. Upon generating the integration data for display, the system may verify that a current user has one or more read/write privileges. Upon verifying the level of privileges, the system may grant the user access to edit the integration data.

In some embodiments, process 500 may be performed iteratively as a user responds to user queries. For example, the system may receive a user response, via the user interface, to the user query. The system may then generate, based on the user response, a revised integrated structure by combining the first structure and the second structure at a second shared structure node for transitioning from the second hierarchy of tasks to the first hierarchy of tasks at the shared structure node.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

Figure 6:
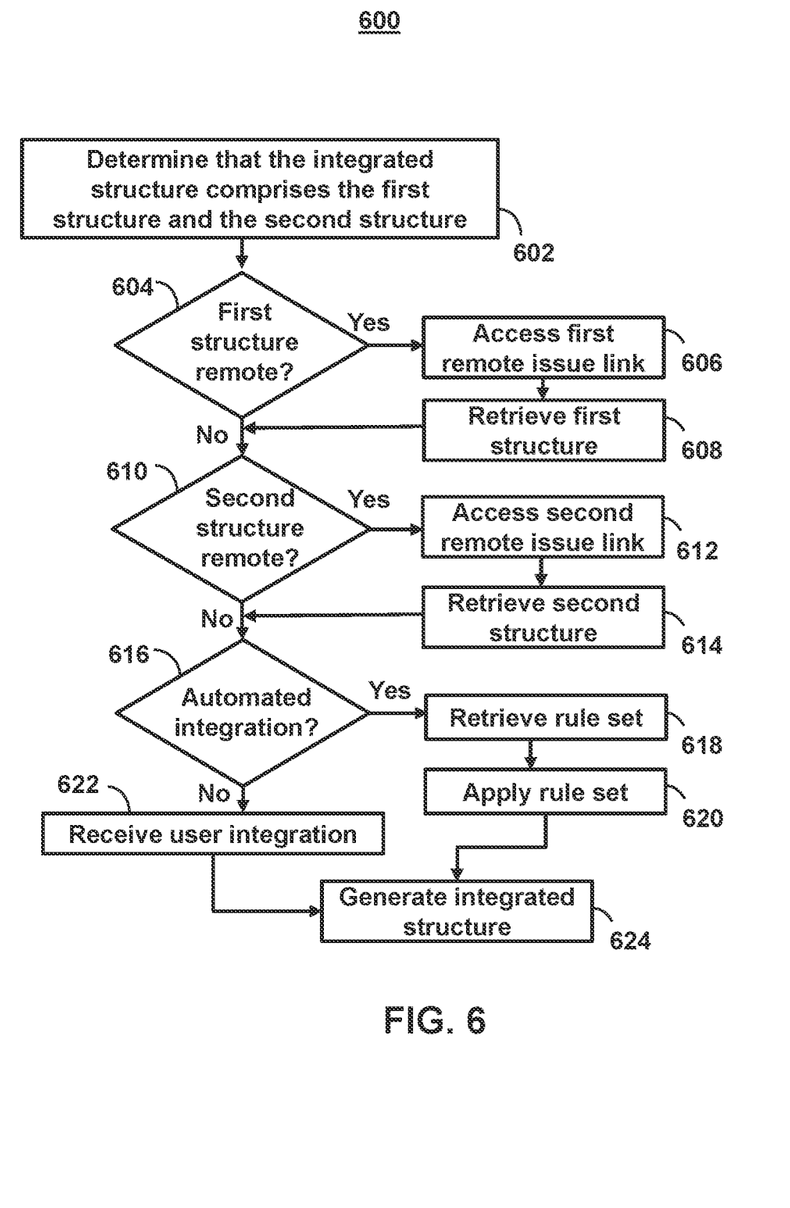
FIG. 6 shows a flowchart of the steps involved in generating an integrated structure in an integrated cyber incident management system, in accordance with one or more embodiments.

FIG. 6 shows a flowchart of the steps involved in generating an integrated structure in an integrated cyber incident management system, in accordance with one or more embodiments. For example, process 600 may represent the steps taken by one or more devices as shown in FIGS. 1-4. In some embodiments, process 600 may be combined with one or more steps of process 500 (FIG. 5)).

At step 602, process 600 determines (e.g., using control circuitry of one or more components of system 400 (FIG. 4)) that the integrated structure comprises the first structure and the second structure. For example, in response to a user query (e.g., via user interface 100 (FIG. 1)) to access an integrated structure for an integrated cyber incident management system, the system may determine the one or more structures (or one or more non-integrated cyber incident management systems related to the structures), or the system may input the user query into a database listing available structures (and/or non-integrated cyber incident management systems related to the structures). The system may filter the available structures to determine one or more structures that comprised the integrated structure.

At step 602, process 600 determines (e.g., using control circuitry of one or more components of system 400 (FIG. 4)) whether or not the first structure is located remotely. For example, if the project contains multiple project management servers, native plugins may be limited to detecting issues related to a single incident type. In some embodiments, the system may read in and build a merged hierarchy (e.g., a cross-server hierarchy) from remote issue links. If process 600 determines that the first structure is located remotely, process 600 proceeds to step 606. If process 600 determines that the first structure is not located remotely, process 600 proceeds to step 610.

At step 606, process 600 accesses (e.g., using control circuitry of one or more components of system 400 (FIG. 4)) a first remote issue link. For example, the first remote issue link may be an identifier that uniquely identifies a remote application and/or a remote object within a remote system housing the first structure. In some embodiments, the remote application may be an application provided by a remote source (e.g., a cyber management intelligence vendor) that may specialize in resolving a given type of cyber incident.

At step 608, process 600 retrieves (e.g., using control circuitry of one or more components of system 400 (FIG. 4)) the first structure. For example, in response to receiving the user request to access the integrated structure, the system may determine that the integrated structure comprises the first structure. In response to determining that the integrated structure comprises the first structure, the system may access the first remote issue link to a first server housing the first structure. Through the first remote issue link, the system may retrieve (e.g., download, stream, and/or otherwise access through one or more API or database functions) the first structure.

At step 610, process 600 determines (e.g., using control circuitry of one or more components of system 400 (FIG. 4)) whether or not the second structure is located remotely. For example, similar to the first structure, the system may determine if the second structure is available locally or remotely. If process 600 determines that the first structure is located remotely, process 600 proceeds to step 612. If process 600 determines that the first structure is not located remotely, process 600 proceeds to step 616.

At step 612, process 600 accesses (e.g., using control circuitry of one or more components of system 400 (FIG. 4)) a second remote issue link. For example, the second remote issue link may be an identifier that uniquely identifies a second remote application and/or a second remote object within a second remote system housing the second structure. It should be noted that in some embodiments, the first and second structures may be located in the same remote server. Furthermore, in some embodiments, the remote server may be a component of system 400 (FIG. 4)).

At step 614, process 600 retrieves (e.g., using control circuitry of one or more components of system 400 (FIG. 4)) the second structure. For example, in response to receiving the user request to access the integrated structure, the system may determine that the integrated structure comprises the second structure. In response to determining that the integrated structure comprises the second structure, the system may access the second remote issue link to a second server housing the second structure. Through the second remote issue link, the system may retrieve (e.g., download, stream, and/or otherwise access through one or more API or database functions) the second structure.

At step 616, process 600 determines (e.g., using control circuitry of one or more components of system 400 (FIG. 4)) whether or not the first and second structure are automatically integrated to generate the integrated structure. For example, in some embodiments, structure automation may be used to reduce manual effort maintaining items. In such cases, the system may retrieve rules supported by cyber incident management system (or structure plugins). Exemplary rules may be based on a type of cyber incident, a comparison with historical cyber incidents, and/or may be filtered based on one or more of the detected incident characteristics. If process 600 determines the first and second structure are automatically integrated to generate the integrated structure, process 600 proceeds to step 618. If process 600 determines that the first and second structures are not automatically integrated to generate the integrated structure, process 600 proceeds to step 622.

For example, the system may determine an incident type for the cyber incident. The system may then determine a rule set for automatically generating the integrated structure based on the incident type. Alternatively or additionally, the system may determine an incident type for the cyber incident. The system may then determine a first historical database corresponding to the incident type. The system may then access a first remote issue link to a first server housing the first historical database. Alternatively or additionally, the system may determine an incident type for the cyber incident. The system may then determine a user profile for assigning to the cyber incident based on the incident type.

At step 618, process 600 retrieves (e.g., using control circuitry of one or more components of system 400 (FIG. 4)) a rule set. In some embodiments, the system may retrieve a standard rule set. Alternatively, the system may retrieve a custom rule set. For example, the system may select a rule set from a plurality of available rules sets based on a type of one or more structures. For example, the system may determine a first system type for the cyber incident management system. The system may then determine a second system type for the non-integrated cyber incident management system. The system may then determine a rule set for automatically generating the integrated structure based on the first system type and the second system type. In some embodiments, the system may query a user to select a rule set.

At step 620, process 600 applies (e.g., using control circuitry of one or more components of system 400 (FIG. 4)) a rule set. For example, the system may automatically generate the integrated structure based on the applying the rule set selected in step 618.

At step 622, process 600 receives (e.g., using control circuitry of one or more components of system 400 (FIG. 4)) user integration. For example, the system may receive user inputs (e.g., via user interface 100 (FIG. 1)) selecting structure nodes that are shared by the first and second structure. Alternatively or additionally, the system may receive user inputs selecting a rule set for integrating one or more structures and/or one or more portions of a structure.

At step 624, process 600 generates (e.g., using control circuitry of one or more components of system 400 (FIG. 4)) an integrated structure. For example, the system may generate for display the integrated structure in a user interface (e.g., user interface 300 (FIG. 3)). In some embodiments, generating the integrated structure may be an iterative process. For example, the system may generate a structure graph for the integrated structure. The system may then determine structure nodes (e.g., between the first and second structure) based on the rule set selected in step 618 or based on the manual integration performed by a user in step 622.

In some embodiments, the system may iteratively perform process 600. For example, the system may receive a user response, via the user interface, to the user query. The system may then generate, based on the user response, a revised integrated structure by combining the first structure and the second structure at a second shared structure node for transitioning from the second hierarchy of tasks to the first hierarchy of tasks (or a different data structure having a different hierarchy of tasks) at the second shared structure node. For example, through this process, the system may switch between full automated and partially automated (or manual) hierarchies while processing a cyber incident.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for processing cyber incidents in cyber incident management systems using dynamic processing hierarchies, the method comprising: receiving, via a user interface, a user request to process a cyber incident through an integrated cyber incident management system, wherein the cyber incident includes an incident characteristic; retrieving, using control circuitry, a first structure for a cyber incident management system, wherein the first structure defines a first hierarchy of tasks through which cyber incidents are automatically processed without user inputs; retrieving, using the control circuitry, a second structure for the cyber incident management system, wherein the second structure defines a second hierarchy of tasks through which cyber incidents are processed based on user inputs received in response to user queries generated for display on the user interface; comparing, using the control circuitry, the incident characteristic to incident characteristics in a database of historical incidents to determine a shared structure node for transitioning from the first hierarchy of tasks to the second hierarchy of tasks at the shared structure node; generating, using the control circuitry, an integrated structure by combining the first structure and the second structure at the shared structure node; processing the cyber incident through the integrated structure to the shared structure node; and generating for display, on the user interface, a user query comprising native data, for the cyber incident, and integration data that describes, in a human-readable format, a relationship of the native data to the integrated structure.

2. The method of embodiment 1, wherein the native data describes a current progress of a task in the first hierarchy of tasks or the second hierarchy of tasks.

3. The method of any one of the preceding embodiments, wherein the native data for the first structure or the second structure describes a source of a field value for a task in the first hierarchy of tasks or the second hierarchy of tasks.

4. The method of any one of the preceding embodiments, wherein the relationship of the native data to the integrated structure comprises a graphical display describing a hierarchal relationship of the first hierarchy of tasks and the second hierarchy of tasks.

5. The method of any one of the preceding embodiments, wherein generating the integrated structure based on the first structure and the second structure comprises retrieving a structure graph for the integrated structure, and wherein the structure graph indicates a location of the structure node in the integrated structure.

6. The method of any one of the preceding embodiments, further comprising: in response to receiving the user request to access the integrated structure, determining that the integrated structure comprises the first structure and the second structure; and in response to determining that the integrated structure comprises the first structure and the second structure, accessing: a first remote issue link to a first server housing the first structure; and a second remote issue link to a second server housing the first structure.

7. The method of any one of the preceding embodiments, further comprising: determining an incident type for the cyber incident; and determining a rule set for automatically generating the integrated structure based on the incident type.

8. The method of any one of the preceding embodiments, further comprising: determining an incident type for the cyber incident; determining a first historical database corresponding to the incident type; and accessing a first remote issue link to a first server housing the first historical database.

9. The method of any one of the preceding embodiments, further comprising: determining an incident type for the cyber incident; and determining a user profile for assigning to the cyber incident based on the incident type.

10. The method of any one of the preceding embodiments, further comprising: receiving a user response, via the user interface, to the user query; and generating, based on the user response, a revised integrated structure by combining the first structure and the second structure at a second shared structure node for transitioning from the second hierarchy of tasks to the first hierarchy of tasks at the second shared structure node.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for processing cyber incidents in cyber incident management systems using dynamic processing hierarchies, comprising:
   cloud-based memory configured to:
      store a first structure for a cyber incident management system, wherein the first structure defines a first hierarchy of tasks through which cyber incidents are automatically processed without user inputs; and
      store a second structure for the cyber incident management system, wherein the second structure defines a second hierarchy of tasks through which cyber incidents are processed based on user inputs received in response to user queries generated for display on a user interface;
   cloud-based control circuitry configured to:
      receive, via a user interface, a user request to process a cyber incident through an integrated cyber incident management system, wherein the cyber incident includes an incident characteristic;
      process the cyber incident through an integrated structure, wherein the integrated structure is generated by combining the first structure and the second structure, and wherein the incident characteristic is used to determine a shared structure node for transitioning from the first hierarchy of tasks to the second hierarchy of tasks;
      generate for display, on the user interface, a user query comprising native data, for the cyber incident, and integration data that describes, in a human-readable format, a relationship of the native data to the integrated structure;
   receive a user response, via the user interface, to the user query; and
      generate, based on the user response, a revised integrated structure by combining the first structure and the second structure at a second shared structure node for transitioning from the second hierarchy of tasks to the first hierarchy of tasks at the second shared structure node.

2. A method for processing cyber incidents in cyber incident management systems using dynamic processing hierarchies, the method comprising:
- receiving, via a user interface, a user request to process a cyber incident through an integrated cyber incident management system, wherein the cyber incident includes an incident characteristic;
- processing the cyber incident through an integrated structure, wherein the integrated structure is generated by combining a first structure and a second structure, wherein the first structure defines a first hierarchy of tasks through which cyber incidents are automatically processed without user inputs, and wherein the second structure defines a second hierarchy of tasks through which cyber incidents are processed based on user inputs received in response to user queries generated for display on the user interface, and wherein the incident characteristic is used to determine a shared structure node for transitioning from the first hierarchy of tasks to the second hierarchy of tasks; and
- generating for display, on the user interface, a user query comprising native data, for the cyber incident, and integration data that describes, in a human-readable format, a relationship of the native data to the integrated structure.

3. The method of claim 2, wherein the native data describes a current progress of a task in the first hierarchy of tasks or the second hierarchy of tasks.

4. The method of claim 2, wherein the native data for the first structure or the second structure describes a source of a field value for a task in the first hierarchy of tasks or the second hierarchy of tasks.

5. The method of claim 2, wherein the relationship of the native data to the integrated structure comprises a graphical display describing a hierarchal relationship of the first hierarchy of tasks and the second hierarchy of tasks.

6. The method of claim 2, wherein generating the integrated structure comprises retrieving a structure graph for the integrated structure, and wherein the structure graph indicates a location of the shared structure node in the integrated structure.

7. The method of claim 2, further comprising:
- in response to receiving the user request to access the integrated structure, determining that the integrated structure comprises the first structure and the second structure; and
- in response to determining that the integrated structure comprises the first structure and the second structure, accessing:
  - a first remote issue link to a first server housing the first structure; and
  - a second remote issue link to a second server housing the first structure.

8. The method of claim 2, further comprising:
- determining an incident type for the cyber incident; and
- determining a rule set for transitioning through the integrated structure based on the incident type.

9. The method of claim 2, further comprising:
- determining an incident type for the cyber incident;
- determining a first historical database corresponding to the incident type; and
- accessing a first remote issue link to a first server housing the first historical database.

10. The method of claim 2, further comprising:
- determining an incident type for the cyber incident; and
- determining a user profile for assigning to the cyber incident based on the incident type.

11. The method of claim 2, further comprising:
- receiving a user response, via the user interface, to the user query; and
- generating, based on the user response, a revised integrated structure by combining the first structure and the second structure at a second shared structure node for transitioning from the second hierarchy of tasks to the first hierarchy of tasks at the second shared structure node.

12. A non-transitory, computer-readable medium for processing cyber incidents in cyber incident management systems using dynamic processing hierarchies, comprising instructions that, when executed by one or more processors, cause operations comprising:
- receiving, via a user interface, a user request to process a cyber incident through an integrated cyber incident management system, wherein the cyber incident includes an incident characteristic;
- processing the cyber incident through an integrated structure, wherein the integrated structure is generated by combining a first structure and a second structure, wherein the first structure defines a first hierarchy of tasks through which cyber incidents are automatically processed without user inputs, and wherein the second structure defines a second hierarchy of tasks through which cyber incidents are processed based on user inputs received in response to user queries generated for display on the user interface, and wherein the incident characteristic is used to determine a shared structure node for transitioning from the first hierarchy of tasks to the second hierarchy of tasks; and
- generating for display, on the user interface, a user query comprising native data, for the cyber incident, and integration data that describes, in a human-readable format, a relationship of the native data to the integrated structure.

13. The non-transitory, computer-readable medium of claim 12, wherein the native data describes a current progress of a task in the first hierarchy of tasks or the second hierarchy of tasks.

14. The non-transitory, computer-readable medium of claim 12, wherein the native data for the first structure or the second structure describes a source of a field value for a task in the first hierarchy of tasks or the second hierarchy of tasks.

15. The non-transitory, computer-readable medium of claim 12, wherein the relationship of the native data to the integrated structure comprises a graphical display describing a hierarchal relationship of the first hierarchy of tasks and the second hierarchy of tasks.

16. The non-transitory, computer-readable medium of claim 12, wherein generating the integrated structure comprises retrieving a structure graph for the integrated structure, and wherein the structure graph indicates a location of the shared structure node in the integrated structure.

17. The non-transitory, computer-readable medium of claim 12, wherein the instructions further cause operations comprising:
- in response to receiving the user request to access the integrated structure, determining that the integrated structure comprises the first structure and the second structure; and
- in response to determining that the integrated structure comprises the first structure and the second structure, accessing:
  - a first remote issue link to a first server housing the first structure; and a second remote issue link to a second server housing the first structure.

18. The non-transitory, computer-readable medium of claim 12, wherein the instructions further cause operations comprising:
determining an incident type for the cyber incident; and
determining a rule set for transitioning through the integrated structure based on the incident type.

19. The non-transitory, computer-readable medium of claim 12, wherein the instructions further cause operations comprising:
determining an incident type for the cyber incident;
determining a first historical database corresponding to the incident type; and
accessing a first remote issue link to a first server housing the first historical database.

20. The non-transitory, computer-readable medium of claim 12, wherein the instructions further cause operations comprising:
determining an incident type for the cyber incident; and
determining a user profile for assigning to the cyber incident based on the incident type.

\* \* \* \* \*